United States Patent [19]
Dee

[11] 4,396,080
[45] Aug. 2, 1983

[54] WEIGHING SYSTEM

[75] Inventor: Gerald M. Dee, Milford, Mass.

[73] Assignee: Pneumatic Scale Corporation, Quincy, Mass.

[21] Appl. No.: 293,677

[22] Filed: Aug. 17, 1981

[51] Int. Cl.³ .................. G01G 23/10; G01G 19/00
[52] U.S. Cl. ..................................... 177/185; 177/1; 177/200
[58] Field of Search ........................... 177/1, 185, 200

[56] References Cited

U.S. PATENT DOCUMENTS

| 3,322,222 | 5/1967 | Baur | 177/200 X |
| 3,670,833 | 6/1972 | Tomohiko et al. | 177/1 |
| 4,108,263 | 8/1978 | Focke et al. | 177/155 X |
| 4,212,361 | 7/1980 | Stocker | 177/200 |

Primary Examiner—George H. Miller, Jr.
Attorney, Agent, or Firm—Robert T. Gammons

[57] ABSTRACT

A device for reducing errors in weighing systems caused by extraneous noise and/or vibration.

13 Claims, 4 Drawing Figures

WEIGHING SCALE

COMPENSATING SCALE

WEIGHING SYSTEM

BACKGROUND OF INVENTION

This invention relates to electronic weighing systems in which a strain gauge is employed to convert mechanical force to voltage. The actual embodiment of the strain gauge device consists of a four gauge bridge mounted on a deflection beam so arranged as to sense beam deflection caused by food product filling the weighing receptacle. The weighing function is accomplished by holding the weighing receptacle in suspension by the strain gauge beam. Vertical deflection or bending occurs as the product is fed into the weighing receptacle. As deflection occurs, the strain gauge bridge is stressed, causing an electrical unbalance. When the bridge becomes unbalanced, unequal current flow will occur in the bridge, producing a voltage output. This voltage output has an exact correlation to the beam deflection and is used to actuate a scale trip solenoid which releases a shutter arrangement to terminate product feed. The beam in use has a deflection factor of $2 \times 10^{-3}$ inches per pound or $1.6 \times 10^{-4}$ inches per ounce. Because of the low deflection factor of the scale system, noise signals of either mechanical or electrical origin will upset the system's operation. Electrical noise is usually higher in frequency than mechanical noise and can be filtered electronically. However, mechanical noise and vibration that occur at the same frequency as normal scale operation cannot be filtered without altering the scale accuracy and response. The scale system in use is a modified spring mass type which is inherently susceptible to free vibration. It has been observed that normal floor vibrations will cause sufficient beam deflection to produce a noise signal of 0.04 ounces. If this vibration signal is not eliminated, an invalid weight readout to actual weight relation will occur. Furthermore, if the weight readout data is used for statistical analysis for the purpose of machine parameter adjustments, it is necessary that the readout information be accurate. It is, accordingly, the purpose of this invention to cancel out the effect of extraneous mechanical noise and vibration.

SUMMARY OF INVENTION

As herein illustrated, the invention resides in a weighing system comprising a weighing scale for receiving product to be weighed, a compensating scale embodying the same mass and dynamics as the weighing scale, means for generating signals proportional to the stresses in the scales in their weighing state, means for summing the signals so as to produce a resultant signal representing the difference in the stresses generated in the two scales, means for providing a set point signal representative of the weight of the product to be weighed, and means operative when the differential signal equals the set point signal to terminate supply of product to the weighing scale. Specifically, the weighing scale and compensating scale are suspended from strain gauge beams or load cells, a product receptacle is attached to the weighing scale for receiving the product to be weighed and a weight is attached to the compensating scale corresponding in weight to the product receptacle. The means for generating the signals are strain gauge bridges mounted on the strain gauge beams so arranged as to sense the beam deflections during weighing conditions. The signals from the strain gauge bridges are transmitted to summing means by way of instrument amplifiers, buffer amplifiers and filter amplifiers. The deflection factor of the strain gauge beams is in the order of 0.002 inches per pound.

The invention will now be described in greater detail with reference to the accompanying drawings, wherein.

Figure 3:
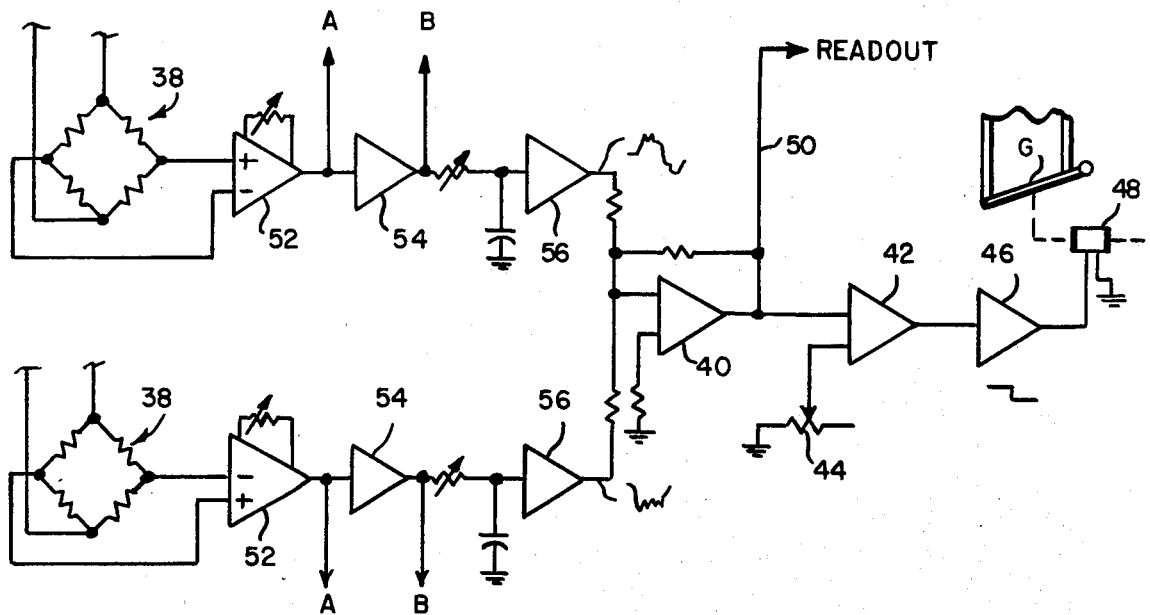
Figure 4:
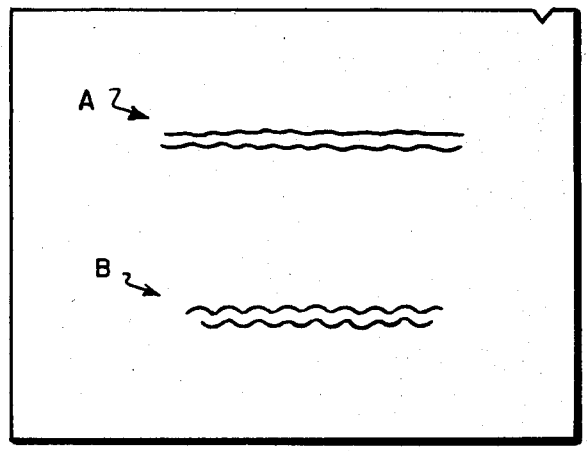

FIG. 3 diagrammatically illustrates the electronic control system designed to cancel out extraneous noise and vibration; and FIG. 4 graphically discloses the reduction in vibration that is the difference in scale signal output with and without the system disclosed therein.

Figure 1:
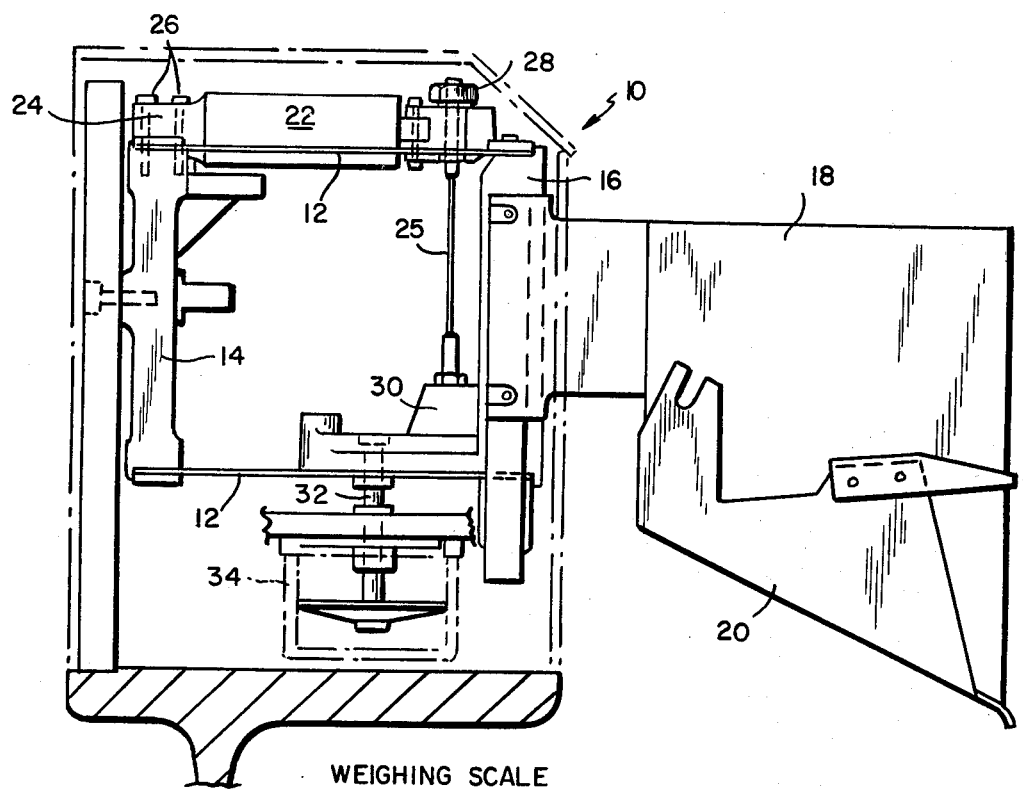
FIG. 1 is an elevation partly in section of an electronic weighing scale provided with a receptacle for receiving the product to be weighed.

Referring to the drawings, FIG. 1, there is shown an electronic weighing scale 10 comprising spaced, parallel, horizontally-disposed upper and lower pairs of stiff leaf springs 12—12 secured at their proximal ends to a frame member 14 and at their distal ends connected by a rigid member 16 to which is mounted a product-receiving receptacle 18 provided with a drop bottom 20. A strain gauge 22 in the form of a beam is rigidly attached at its proximal end 24 by means of bolts 26 to the frame member 14 between the spring of the upper pair of springs 12. A wire 25 is adjustably connected at its upper end by a threaded nut 28 to the distal end of the strain gauge. The lower end of wire is connected to a block 30 which, in turn, is connected by a spindle 32 to a dash pot 34 which damps oscillation of the structure. The pairs of stiff leaf springs 12—12 constitute a beam, the free end of which will deflect as product is delivered into the receptacle 18. The strain gauge 22 will, at the same time, be deflected in proportion to the amount of product dumped into the receptacle 18.

Figure 2:
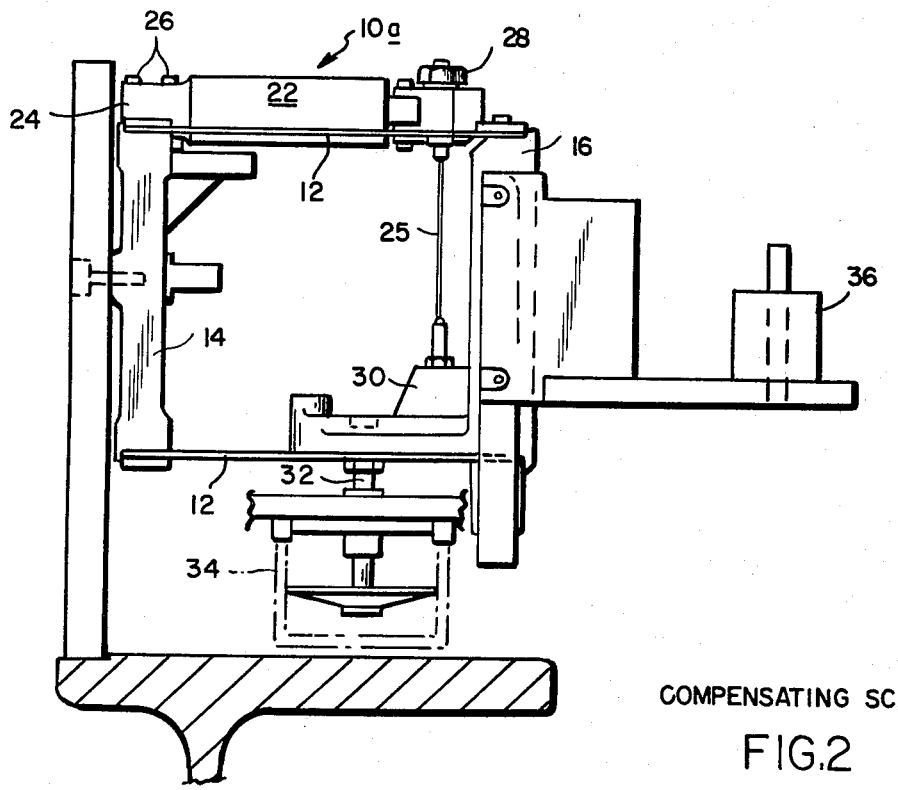
FIG. 2 is an elevation partly in section of a scale embodying the same mass and dynamics as the weighing scale shown in FIG. 1 to which there is attached a weight corresponding to the weight of the product receiving receptacle.

The deflection in the strain gauge 22 is very small, to wit, in the order of $2 \times 10^{-3}$ inches per pound or $1.6 \times 10^{-4}$ inches per ounce and while this deflection is constant and highly repeatable, because it is low, noise signals of either mechanical or electrical origin will upset the system's operation. Electrical noise is usually higher in frequency than mechanical noise and can be filtered electronically. However, mechanical noise and vibration that occur at the same frequency as normal scale operation cannot be filtered without altering scale accuracy and response. It has been found that a scale system of this kind is inherently susceptible to free vibration and that normal floor vibration will cause sufficient beam deflection to produce a noise signal in the order of 0.04 ounces. If this vibration signal is not eliminated, an invalid weight readout to actual weight relationship will occur. Furthermore, if the weight readout data is used for statistical analysis for the purpose of machine parameter, adjustment is necessary in order that the readout information be accurate. Accordingly, to compensate for such extraneous vibration and noise and thus to eliminate to a substantial degree error introduced from such sources, there is provided a compensating scale such as shown in FIG. 2. The compensating scale 10 duplicates the mass and dynamics of the weighing scale, differing only from the weighing scale in that a weight 36 corresponding in weight to the product-receiving receptable 18 is substituted for the weighing receptacle. All of the other component parts of the compensating scale are identical as indicated by corresponding reference characters applied to the corresponding components.

The electronic control for the weighing scale and the compensating scale is disclosed in FIG. 3 and is designed to convert the mechanical stresses developed by bending of the strain gauges 22 to electrical signals in such a way as to cancel out extraneous disturbances and thus measure the actual weight of the product delivered into the weighing receptacle 18 free of any error which might be caused by such extraneous disturbances. This is achieved, as shown in FIG. 3, by providing each of the respective strain gauges 22 with a wheatstone bridge 38 which is responsive to the deflections in the strain gauges 22 during the weighing operation to convert the deflection of the gauges to voltages in the form of signals which are transmitted to a common summing amplifier 40. The signal generated by the summing amplifier 40 is transmitted to a voltage comparator 42 which also receives a variable set point voltage 44. Balancing of the summing signal and the set point signal results in transmitting a signal to a switching amplifier 46 which, in turn, transmits a signal to a solenoid 48 which terminates feed of product to the receptacle 18 by closing an appropriate gate G in the product delivery conduit, not shown. A conductor 50 connected between the amplifiers 40 and 42 provides for weight readout or data acquisition for microprocessor control. Between each of the bridges 38 and the summing amplifier 40, there are, respectively, instrument amplifiers 52, buffer amplifiers 54 and filter amplifiers 56. The bridges 38 are connected to provide 180° out-of-phase current to the summing amplifier 40 which algebraically adds the signals from the respective bridges cancelling the common signal or noise component.

Referring specifically to the circuitry of FIG. 3, the output from the strain gauges 38 is applied to the input of the instrument amplifiers 52. The purpose of the instrument amplifiers is to amplify the signals to a usable level. The gain factor of the instrument amplifiers 52 is set by the gain adjustment at 1400. This means that the voltage level at the point A is 1400 times higher than that of the instrument amplifiers input. The signals are then applied to the buffer amplifiers 54 for the purpose of increasing the signal current. The output signals at the points B now have the necessary power $P = X \times I$ to undergo further electronic conditioning. The output from the buffer amplifiers 54 is applied to the input of the three-stage adjustable filter amplifiers 56. The filters 56 have a low frequency cutoff of 2 HZ. The purpose of the filter amplifiers is to eliminate all electrical signals above 2 HZ (2 cycles per second). Since a normal scale operation occurs at approximately 2 HZ, it is important to eliminate the spurious signals at other frequency that would cause false scale trip. The output from the filter amplifiers 56 is applied to one input of the summing amplifier 40 and the resultant output to one input of the voltage comparator 42. The other input 44 of the comparator 40 is used to manually adjust a set point voltage and when the signal voltage equals the preset voltage, an output signal is generated by the comparator. The comparator is used to derive a voltage to weight output signal. The output from the voltage amplifier is applied to the switch amplifier 46 and the switch amplifier is used to actuate the scale solenoid 48. The scale trip solenoid 48 releases the gate G to terminate product feed to the product receptacle 18.

The need for vibration cancellation devices derives from the fact that in virtually every major industry as a means of process control, microprocessors have been devised to provide output commands to a machine or process based on input signals from the machine or process. Microprocessor based controls for weighing and filling machines use weight related voltage signals from the scale control device to perform a process algorithm for the specific purpose of holding weightments at a specified weight. The purpose of the vibration cancellation device is to cancel low frequency mechanical vibrations that occur at the same frequency as the weighing operation. If the vibration signals are not eliminated, a false weight readout signal will occur. Furthermore, if the readout data is used for statistical analysis for the purpose of making a precise adjustment to weight setpoint, it is important to insure the integrity of the weight readout data.

The noise cancellation system described herein eliminates the effect of mechanical noise and vibration by using a compensating scale duplicating the mass and dynamics of the weight scale. All of the machine vibrations will be common to both weighing and compensating scales. Hence, the only force not common to both scales is that caused by the product filling the weight receptacle.

To demonstrate the requirement for noise cancellation, the scale signal output (scale empty) was monitored at the final amplifier with a type 464 oscilloscope. Signal photos were taken with and without the cancellation beam, the results of which are depicted graphically in FIG. 4 which shows the signal output with cancellation A and without cancellation B. The oscillation 6 HZ apparent in FIG. 4 was caused from floor vibration and induced sufficient beam deflection to cause a quiescent voltage output equivalent to a 0.04 ounce weight load. When the compensator beam is connected, the noise signal is attenuated to a level barely discernible at the output amplifier. It should be noted that this data was acquired under a relatively stable industrial environment under more austere conditions than in normal industrial use where vibration levels would be higher, making the noise cancellation beam more essential.

While the strain gauges are described as first class beams, load cells may be substituted therefor.

It should be understood that the present disclosure is for the purpose of illustration only and includes all modifications or improvements which fall within the scope of the appended claims.

What is claimed is:

1. A weighing system comprising a weighing scale to which product is delivered, a compensating scale, means responsive to the stresses developed in the respective scales during a weighing operation to produce signals of predicted magnitude, means for cancelling out the portion of the signals due to environmentally induced low frequency vibrations common to the respective scales and means responsive to the residual signal to terminate delivery of product to the weighing scale.

2. A weighing system comprising a weighing scale for receiving product to be weighed, a compensating scale embodying the same mass and dynamics as the weighing scale, means for generating signals proportional to the environmentally induced low frequency vibrations in the scales in their weighing state, means for summing the signals so as to produce a resultant signal representing the difference in the stresses generated in the two scales, means for providing a set point signal proportional to the weight of product delivered to the weighing scale, means for balancing the differential signal against the set point signal and means operative when the differential signal equals the set point signal to terminate delivery of product to the weighing scale.

3. A system according to claim 2 wherein the means for generating the signals comprise strain gauges for converting the mechanical stresses due to environmentally induced low frequency vibrations developed in the scales during weighing to voltages.

4. A system according to claim 2 wherein the means for generating the signals comprise bridges mounted on beams so arranged as to sense the beam deflections during weighing conditions.

5. A system according to claim 4 wherein the deflection factor of the beams is 0.002 inches per pound.

6. A system according to claim 4 wherein the signals from the bridges are transmitted to the summing means by way of instrument amplifiers, buffer amplifiers and filter amplifiers.

7. A system according to claim 4 wherein the signals from the two bridges are transmitted by amplifiers to a common summing amplifier.

8. A system according to claim 7 wherein the signal from the summing amplifier is transmitted through a voltage comparator which is supplied with a set point signal and a switching amplifier responsive to the signal from a voltage comparator provides for tripping a solenoid which, in turn, terminates delivery of product to the container by closing a gate in the delivery system.

9. A weighing system comprising a weighing scale provided with a receptacle to receive product to be weighed, a compensating scale weighed to match the weight of the receptacle of the weighing scale, means for generating signals proportional to the dynamic stresses in each of the scales in the operative state due to environmentally induced low frequency vibrations, means for summing the signals so as to provide a resultant signal representing the differences in stresses generated between the two scales when the weighing scale is loaded with product, means for generating a set point signal proportional to the weight of product delivered into the receptacle, means for balancing the differential signal against the set point signal and means operative when the differential signal equals the set point signal to terminate delivery of product into the receptacle.

10. A weighing system comprising a weighing scale suspended from a strain gauge, a compensating scale of the same mass and dynamics as the weighing scale also suspended from a strain gauge, said strain gauge having identical deflection factors, a receptacle attached to the weighing scale for receiving product to be weighed, a weight attached to a compensating scale corresponding in weight to the receptacle, means for generating signals proportional to the environmentally induced low frequency vibrations developed in the strain gauges under weighing conditions, means for summing the signals so as to provide a resultant signal representing the differences in stress generated in the two strain gauges when the receptacle is loaded with product, means for generating a set point signal, means for balancing the differential signal against the set point signal and means operative when the differential signal equals the set point signal to terminate product delivery to the receptacle.

11. A weighing system comprising a weighing scale, a compensating scale, strain gauges, adjustable couplings suspending the respective scales from the respective strain gauges, a receptacle attached to the weighing scale, a weight attached to the compensating scale corresponding to the weight of the receptacle, means associated with the strain gauges for generating signals proportional to the environmentally induced low frequency vibrations in the strain gauges, means for summing the signals so as to produce a signal representing the difference in the stresses generated in the strain gauges, means providing a set point signal for product weight, means for balancing the differential signal against the set point signal and means operative when the differential signal equals the set point signal to terminate delivery of product to the receptacle.

12. The method of weighing product comprising providing a weighing scale, providing a compensating scale having the same mass and dynamics as the weighing scale, delivering product onto the weighing scale, algebraically adding the stresses developed in the two scales by environmentally induced low frequency vibrations and employing the differential to terminate delivery of product to the weighing scale.

13. The method of weighing product comprising providing a weighing scale for receiving product, providing a compensating scale having the same mass and dynamics as the weighing scale, delivering product onto the weighing scale, generating signals proportional to the stresses developed in the scales due to environmentally induced low frequency vibrations 180° out-of-phase, adding the signals and employing the resultant signal to terminate delivery of product to the weighing scale.

* * * * *